March 12, 1935.  R. W. McLEAN  1,994,077
SAW GUMMING APPARATUS
Filed Sept. 5, 1933  7 Sheets-Sheet 3

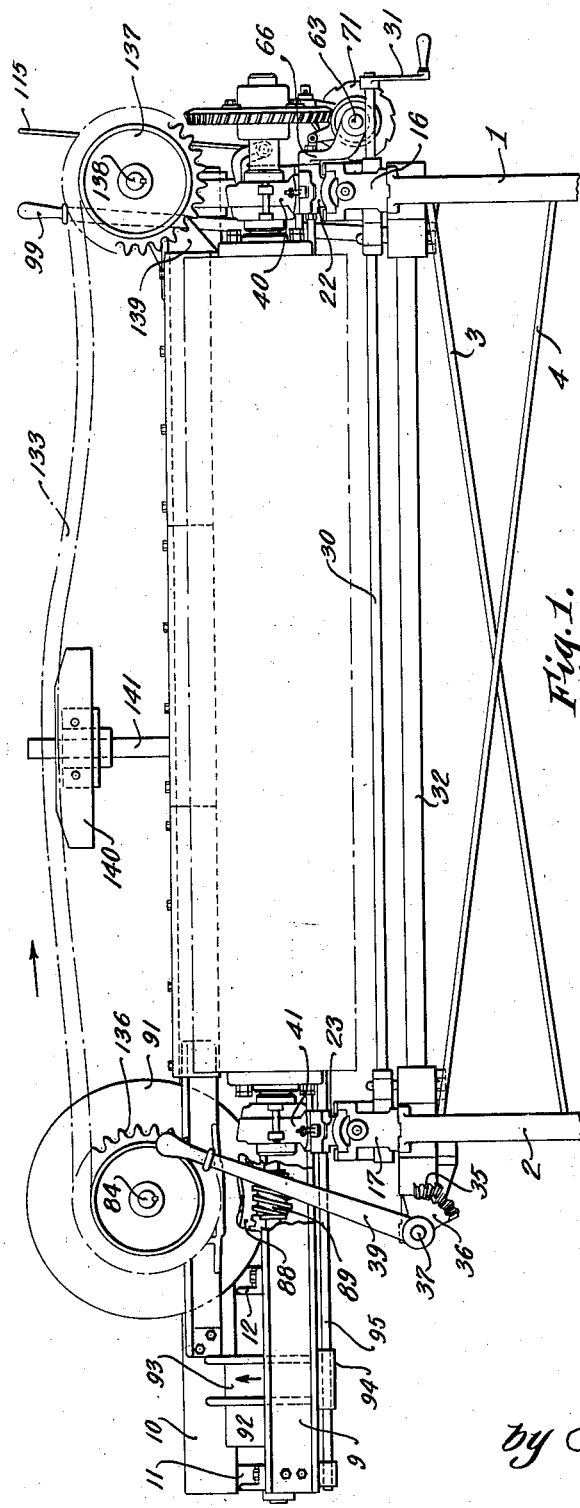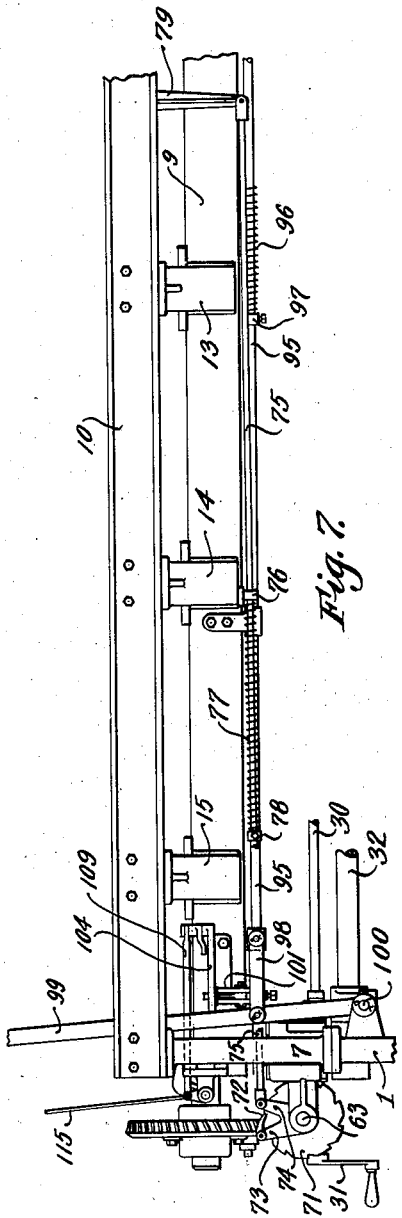

Fig. 3.

Inventor,
Robert W. McLean,
by Roberts Cushman Woodberry
Attys.

March 12, 1935.  R. W. McLEAN  1,994,077
SAW GUMMING APPARATUS
Filed Sept. 5, 1933   7 Sheets-Sheet 4

Inventor,
Robert W. McLean,
by Roberts Cushman Woodberry
Attys.

Inventor,
Robert W. McLean,
by Roberts Cushman Woodbury
Attys.

March 12, 1935.  R. W. McLEAN  1,994,077
SAW GUMMING APPARATUS
Filed Sept. 5, 1933   7 Sheets-Sheet 6

Inventor,
Robert W. McLean,
by Roberts Cushman Woodberry
Attys.

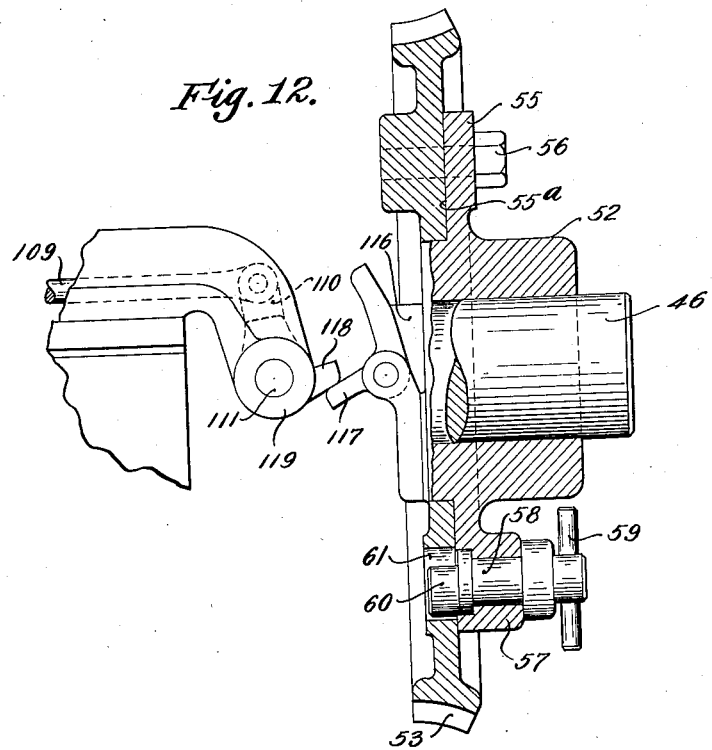
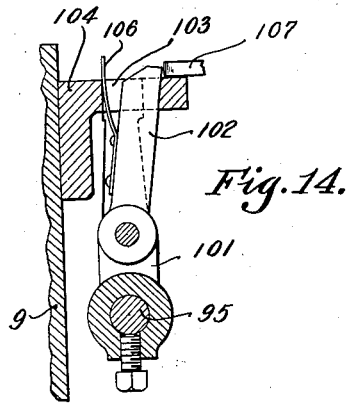
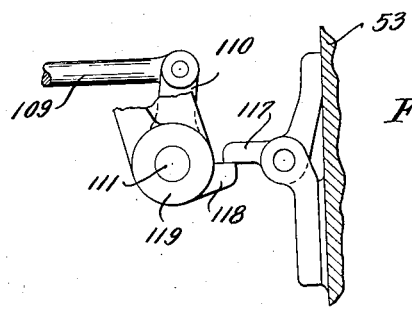
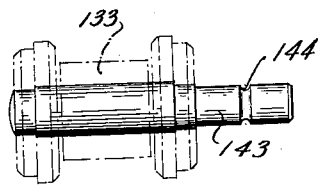

Patented Mar. 12, 1935

1,994,077

UNITED STATES PATENT OFFICE 1,994,077

SAW GUMMING APPARATUS

Robert W. McLean, Bridgewater, Mass., assignor to Carver Cotton Gin Company, East Bridgewater, Mass., a corporation of Massachusetts Application September 5, 1933, Serial No. 688,145

15 Claims. (Cl. 76—32)

This invention pertains to the art of gumming saws and relates more particularly to apparatus capable of gumming a plurality of saw blades simultaneously. While the principle of the invention is of wider utility, the embodiment thereof herein disclosed by way of example is designed with special reference to the gumming of spaced disk blades or saws such as those comprised in the cylinder of a saw gin.

In my Patent No. 1,472,013, dated October 23, 1923, I have described the utility of saw gumming apparatus and some of the problems which are met with in practice, particularly those resulting from the unskillful and unreliable character of the workmen available in ginning mills for performing the gumming operation, and the consequent necessity of providing apparatus of as simple and fool-proof character as is practicable. While as compared with prior practice, the apparatus disclosed in my aforesaid patent represents a substantial and valuable advance in the direction of simplicity and reliability, I have now devised apparatus of even more simple type and capable of performing the gumming operation more expeditiously and with improved results.

In the apparatus of my aforesaid patent, the cutting is performed by means of a series of rotating disk cutters or files mounted upon independent spindles, and the multiplicity of individual spindles necessarily complicates the drive mechanism and the means for determining the cutting pressure. Moreover, since each disk cutter, with its associated parts, occupies appreciable space longitudinally of the saw cylinder, the spacing of the saws on the latter cannot be reduced below a very definite minimum. However, for some purposes, recent practice in ginning calls for a very close spacing of the saws, and a substantial increase in the number of saws in the cylinder.

Since the number of such disk files is necessarily substantially less than the number of saws on the cylinder, to wit, usually one file for each third saw, it is necessary in the use of the prior type of apparatus, to turn the saw shaft through three complete revolutions in making each cut, necessitating careful indexing during each rotation to insure proper tooth spacing, and a relative axial movement of the cylinder and cutters between each such revolution. Furthermore, since the individual gummer files vary somewhat in diameter and edge thickness; and since their spindles do not always run exactly true, and moreover, as the individual file spindles are resiliently positioned, the several files do not necessarily cut notches of the same shape or to the same depth, and thus successive teeth on the same saw or on adjacent saws may vary substantially in contour and length, while the teeth on adjacent saws may not be in registry or alignment. I have observed that better results in the gin are to be obtained if all of the saw cylinder teeth are of substantially the same depth and shape, and when the teeth of adjacent saws are in registry. In accordance with the present invention I provide mechanism of simple character operative to gum all of the saws of the cylinder simultaneously so as to complete the gumming operation in a single revolution of the cylinder, regardless of the number or spacing of the saws, even including the limiting condition in which adjacent saws are in substantial contact, and at the same time insure substantial uniformity of tooth shape and registry of the teeth of adjacent saws throughout the cylinder. Cylinders thus gummed show a marked improvement in the quality and quantity of the staple or lint produced by the gin.

Not only is the improved apparatus capable of gumming teeth already cut but may, if desired, be used for cutting teeth upon the edges of saw blanks or blades, since the cutting operation is rapid and the indexing means is accurate and readily adjustable to saws of different diameters and having teeth of different size and number.

In accomplishing the above improved results I provide for moving a cutting element, for example a file, longitudinally of the saw cylinder so as successively to engage each saw blade of the cylinder. By thus moving the cutting element, the teeth of adjacent saws are necessarily in substantially exact registry, axially of the cylinder, and are of uniform size and shape,—the spacing or number of the saws making up the cylinder being immaterial so far as the gumming operation is concerned. Moreover, by employing a series of such cutters moving in succession, a very rapid cutting action may be attained, each cutter acting in sequence to the cutter preceding it. As a convenient mode of actuating such succession of cutters, I prefer to secure them to an endless chain which is so driven and guided as to present the cutters to the saws of the cylinder in accurate and proper relation whereby to secure the desired results.

While I have herein illustrated one desirable embodiment of the invention by way of example, I wish it to be understood that the underlying principle is capable of application in other specific ways and that all such modifications of apparatus as fall within the scope of the claims appended hereto are to be regarded as within the purview of the invention.

In the accompanying drawings wherein I have illustrated the application of my invention in one desirable type of apparatus, Fig. 1 is a front elevation of the apparatus, omitting the cutters and cutter chain, and showing a saw cylinder mounted in position for gumming;

Fig. 3 is an elevation, with the lower part of the frame broken away, showing the right-hand end of the apparatus;

Fig. 7 is a fragmentary rear elevation illustrating in particular certain parts shown in Fig. 6;

Fig. 8 is a fragmentary vertical section, to larger scale, showing one of the cutters disposed in position operatively to engage a saw and showing details of the cutter guiding and driving elements;

Fig. 9 is a plan view of a cutter holder with a cutter therein;

Fig. 12 is a fragmentary vertical section on line 12—12 of Fig. 3, showing the parts as they appear just after the belt-shifter release trip has acted;

Fig. 13 is a fragmentary view, showing the trip devices of Fig. 12 just prior to stoppage of the machine;

Fig. 14 is a fragmentary vertical section, on line 14—14 of Fig. 4, to large scale, showing the belt-shifter latch in operative position; and Fig. 15 is a side elevation of one of the cutter-carrier chain link pins with its cutter supporting extension.

Frame

Figure 2:
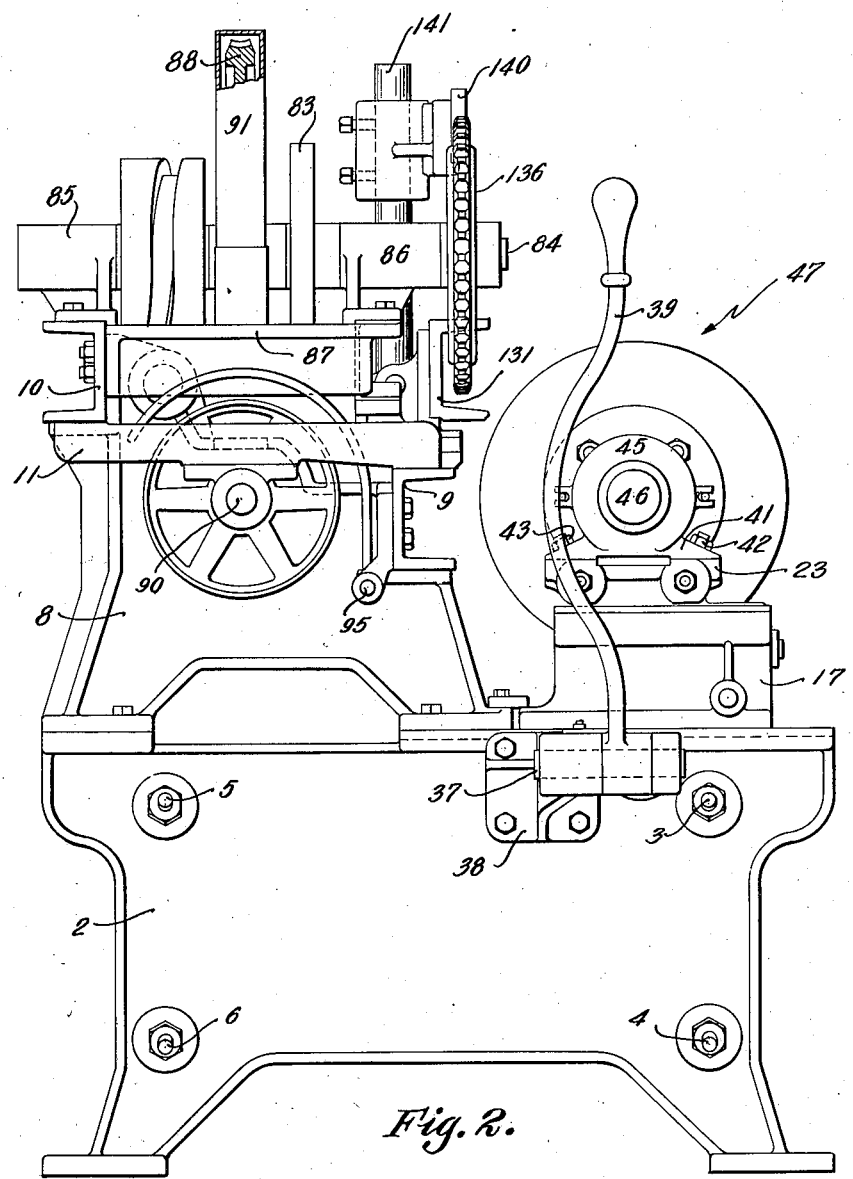
Fig. 2 is an elevation, to larger scale, of the left-hand end of the machine, as viewed in Fig. 1.

As herein disclosed the machine comprises a main frame or table consisting of a pair of laterally spaced end members (conveniently castings) 1 and 2, respectively, braced and held in proper relation by means of transverse rods or bars 3, 4, 5 and 6. The upper edges of the end frame members 1 and 2 are provided with supporting surfaces to which upper end frame members 7 and 8 are bolted, respectively. The members 7 and 8 are rigidly united at the front by a channel bar 9 (Fig. 5) and at the rear by a channel bar 10. Spaced, bearing-supporting bridge pieces 11 and 12 (Fig. 4) unite the channel bars 9 and 10 near the left-hand end of the machine, while spaced cutter carriage supports, 13, 14 and 15 unite the channel bars 9 and 10 at points rearward of the intended position of the saw cylinder. The frame also comprises brackets and other supports for the various moving parts as hereinafter more fully described.

Saw cylinder supporting means

The upper edges of the main end frame members 1 and 2, forwardly of the top frame members 7 and 8, are finished and provided with spline-ways 7a and 8a to form guides for a pair of saw cylinder supporting slides 16 and 17 respectively. These slides are arranged to move from front to rear along the guides, thus provided on the end frames, and have downwardly projecting spline-ribs fitting within the respective spline-ways, although other and equivalent means for guiding them may be substituted.

The upper edge of each of the slides 16 and 17 is furnished with a pair of spaced guide surfaces 18 and 19 respectively (Fig. 10) on which rest laterally projecting flanges 20 and 21, each such pair of flanges projecting from one of a pair of cylinder adjusting brackets 22 and 23 respectively. The brackets 22 and 23 (at opposite ends of the machine, respectively) are each held in proper sliding relation relative to their guide surfaces 18 and 19 by means of gibs 24 and 25 (Fig. 10) which overhang the upper surfaces of the lateral flanges 20 and 21, respectively.

Figure 10:
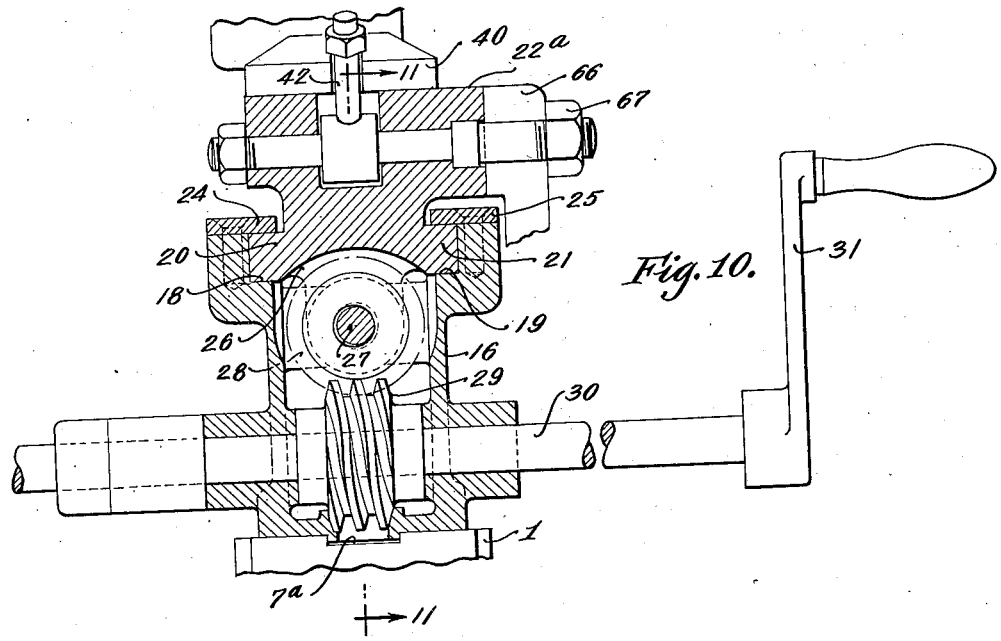
Fig. 10 is a fragmentary vertical section, to large scale, substantially on the line 10—10 of Fig. 4.
Figure 11:
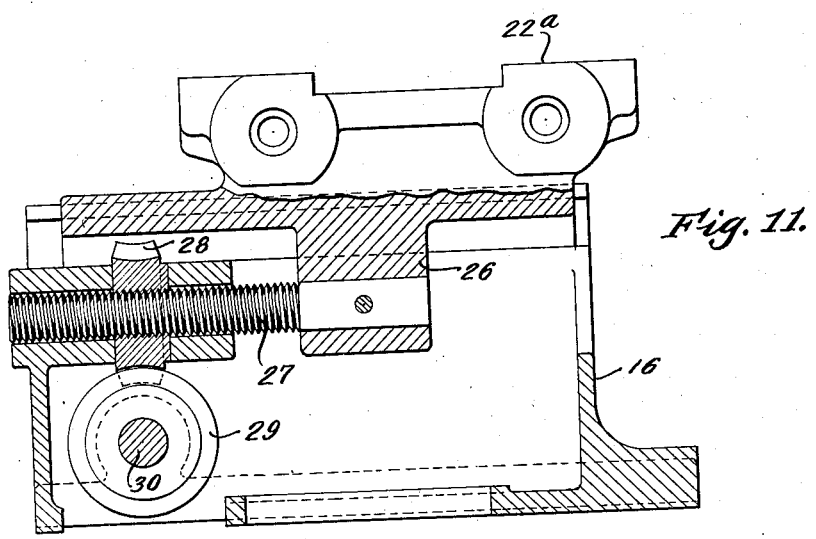
Fig. 11 is a fragmentary vertical section on the line 11—11 of Fig. 10, omitting the bearing saddle and the anchor bolts.

Each of the brackets 22 and 23 has a downwardly directed extension 26 (Fig. 11) disposed within a channel or recess in the corresponding slide 16 or 17, respectively, and each of said extensions 26 has fixedly secured thereto a horizontally projecting screw-threaded stud or pin 27 (Figs. 10 and 11). Each of these studs or pins 27 has screw-threaded engagement with a screw-threaded axial bore in a worm wheel 28 housed in a chamber in the corresponding slide 16 or 17, suitable provision being made to prevent any substantial front to rear movement of the worm wheel 28 relative to the slide in which it is housed. Meshing with each worm wheel 28 is a worm 29 also housed in a suitable cavity in the corresponding slide 16 or 17, each worm being fixed to a shaft 30 (Fig. 10) which extends from one side to the other of the machine and which is arranged to turn in suitable bearings in the slides 16 and 17 respectively. At one end, the shaft 30 is provided with a crank 31 or other appropriate means for turning it manually, the shaft being held against endwise movement in appropriate bearing means in the machine frame.

The frame members 1 and 2 are also furnished with bearings for a shaft 32 (Figs. 1, 5 and 7) substantially parallel to the shaft 30 but located somewhat to the rear of and below the latter, and this shaft 32 carries a pair of crank members 33 (one being shown in elevation in Fig. 5) fixedly secured to the shaft adjacent to the inner sides of the frame members 1 and 2 respectively. Curved links 34 are pivotally connected at one end to each of the respective cranks 33 and at their opposite ends these links are provided with openings through which the shaft 30 passes. The shaft 32 projects outwardly beyond the left-hand frame member 2 and is there provided with a segmental pinion 35 (Fig. 1) meshing with a segmental gear 36 forming one arm of a bell-crank lever mounted on a stud shaft 37 (Fig. 2) supported in bearings in a bracket 38 bolted to the outside of the frame member 2. The other arm 39 of this bell-crank lever projects upwardly and is preferably provided with a handle to be grasped by the hand for moving the lever with its segmental gear 36. When the lever is rocked, the shaft 32 is thereby turned a part of a revolution and by means of the cranks 33 and connecting links 34 (Fig. 5) causes the slides 16 and 17 at opposite sides of the machine to move unisonally from front to rear. It may be noted that when the parts occupy the position of Fig. 5 (that is to say, the operative or saw-gumming position) a line connecting the pivot centers at opposite ends of each link 34 is slightly below the axis of the shaft 32 so that the slides are locked against any tendency to move forwardly along their guides even when subjected to heavy pressures.

By actuation of the lever handle 39, the slides 16 and 17 may be moved quickly from their outermost or saw cylinder receiving position to their innermost position, or vice versa, thus to advance the saw cylinder into the field of action of the cutters or to remove it therefrom; for example, at the beginning and completion of the gumming operation, respectively. On the other hand, by turning the crank 31, the adjusting brackets 22 and 23 may be simultaneously and accurately adjusted forwardly or rearwardly,— for example, to feed the cylinder forward a very small or micrometric amount between successive cutting operations. For this latter purpose I have found that a gear ratio between the parts such that fifteen full turns of the crank 31 are required to cut a full depth tooth from the blank, gives good results in practice.

Each of the adjusting brackets 22 and 23 is provided with an upper surface 22a (Figs. 10 and 11) arranged removably to support bearing saddles 40 and 41 (Fig. 1) respectively. Conveniently each saddle may be provided with open ended slots at its front and rear ends respectively, said slots being adapted to receive pivoted anchor bolts 42 and 43. By loosening the nuts on these bolts, the latter may be swung down out of the slots, thus permitting rapid removal and replacement of the bearing saddles.

Each saddle comprises a bearing box 44 and 45 respectively, preferably containing roller or ball bearings adapted to receive and accurately and rotatably to support the shaft 46 of a saw cylinder 47. This cylinder may be built up in any desired manner, for example, as disclosed in the patent to McLean No. 1,345,207, dated June 29, 1920, and comprises the shaft 46 with a series of saw blades 48 secured thereto with intervening spacers 49 and with heads 50 at each end. While this method of constructing a saw cylinder is desirable, for the reasons pointed out in the McLean patent, this present apparatus is in nowise concerned with the particular details of construction of the saw cylinder, being adapted to cooperate the saw cylinders of any usual type.

The opposite ends of the saw cylinder shaft 46 are disposed to turn in the bearing bosses 44 and 45 respectively, when the cylinder has been placed in position in the machine, and at its right-hand end the saw cylinder shaft or mandrel 46 projects to a substantial distance beyond the bearing 44, such shaft extension being that usually provided for receiving the driving pulley when the saw cylinder is mounted in the cotton gin,—this projecting end of the shaft being provided with a keyway and key 51 (Fig. 3) for securing the driving pulley thereto.

When mounted in the gumming machine as herein disclosed, this shaft extension receives the hub 52 of an indexing gear 53 (Figs. 3 and 12). This hub is provided with a set screw 54 (Fig. 3) adapted to be set up against the key 51, for example, so as fixedly to secure the hub to the shaft 46 during the gumming operation. The hub 52 is also furnished with a peripheral flange 55 (Fig. 12) having a finished radial surface 55a for contact with the face of the indexing gear 53. The flange 55 is furnished with a plurality of circumferentially elongate slots for the reception of clamping bolts 56 (Fig. 3) adapted adjustably to secure the indexing gear to the flange 55 so that the hub 52 and the saw shaft 46 are thereby constrained to turn with the gear. The flange 55 is also furnished with a bearing boss 57 providing a bearing for an adjusting stud 58 (Fig. 12) having at its outer end a handle 59 or other convenient means by which it may be turned, and provided at its inner end with a crank or eccentric portion 60 disposed in a radial slot 61 in the gear 53. By loosening the bolts 56 the gear 53 may be turned relatively to the hub 52 by means of handle 59, this adjustment being desirable in order that the saw teeth may be brought into proper initial relation to the gumming instrumentalities after the saw cylinder has been mounted in its bearings in the machine, and in position such that it may be indexed accurately as the saw shaft is intermittently turned. After the gear has been adjusted properly by means of the handle 59, the bolts 56 are set up to hold the parts in adjusted position during the ginning operation. Preferably the machine is furnished with a set of interchangeable index gears 56 of different pitch—diameters and numbers of teeth for use in gumming saws having different numbers of teeth. For example, for cutting saws having three hundred teeth, the index gear may have sixty teeth and a pitch-diameter of 9.5492 inches, while for cutting saws having three hundred and fifteen teeth, an index gear having sixty-three teeth a pitch-diameter of 10.0267 inches may be used, etc.

The index gear (which is preferably a worm gear) constantly meshes with a worm 62 (Fig. 3) fixed to a shaft 63 turning at its forward end in spaced bearings 64 and 65 disposed at opposite sides of the worm 62 and carried by a bracket 66 (Fig. 10) attached by bolts 67 to the outer or right-hand face of the adjusting brackets 23. These bolts 67 form convenient pivots for the saddle anchor bolts 42 and 43. At its rear end, the shaft 63 is mounted to turn and slide in spaced bearings 68 and 69 (Fig. 3) carried by a bracket 70 bolted to the upper right-hand frame member 7.

On the shaft 63, between the bearings 68 and 69, an indexing ratchet wheel 71 is mounted. This ratchet wheel is splined to the shaft 63 so as to turn with the latter, but at the same time to permit the shaft to slide longitudinally as occasioned by axial movement of the worm 62 (when the bracket 66 carried by the support 22 partakes of the front-to-rear motion of the saw shaft).

The ratchet wheel 71 is intermittently driven by means of a pawl 72 (Figs. 3, 4 and 7) mounted between the outer arms 73 of a pair of parallel pawl-carrying levers mounted to turn freely on the shaft 63 at opposite sides respectively of the ratchet wheel 71 and between the latter and the bearings 68 and 69 respectively. The spaced inner arms 74 (Fig. 7) of these pawl-carrying levers are disposed at opposite sides of and pivotally connected to the outer end of a rod 75 which is arranged to slide longitudinally in suitable brackets 76 carried by the machine frame. A coiled compression spring 77 (Fig. 7) encircles the rod 75 and bears at one end against one of the brackets 76 and its other end against a collar 78 fixed to the rod 75. The spring thus tends to move the rod toward the right-hand side of the machine, as viewed in Fig. 1, thereby to cause the pawl 72 to be retracted for engagement with a new tooth of the ratchet 71. The inner or left-hand end of the rod 75 is pivotally connected to a downwardly directed arm 79 (Fig. 5) of a bell-crank lever fulcrumed at 80 (Fig. 4) upon a stud carried by a fixed part of the machine frame, said lever having a substantially horizontal arm 81 provided with a cam follower roll arranged to engage the inner cam surface of a forwardly projecting flange 82 (Fig. 5) of a cam disk 83 mounted upon a shaft 84.

Drive and stop mechanism

The shaft 84 is mounted to turn in a rear bearing 85 supported by the rear channel bar 10 of the frame and in a front bearing 86 carried by a yoke 87 (Fig. 4) bolted at its rear end to the bar 10 and resting upon and secured at its forward part to a bracket attached to the front channel bar 9.

Figure 4:
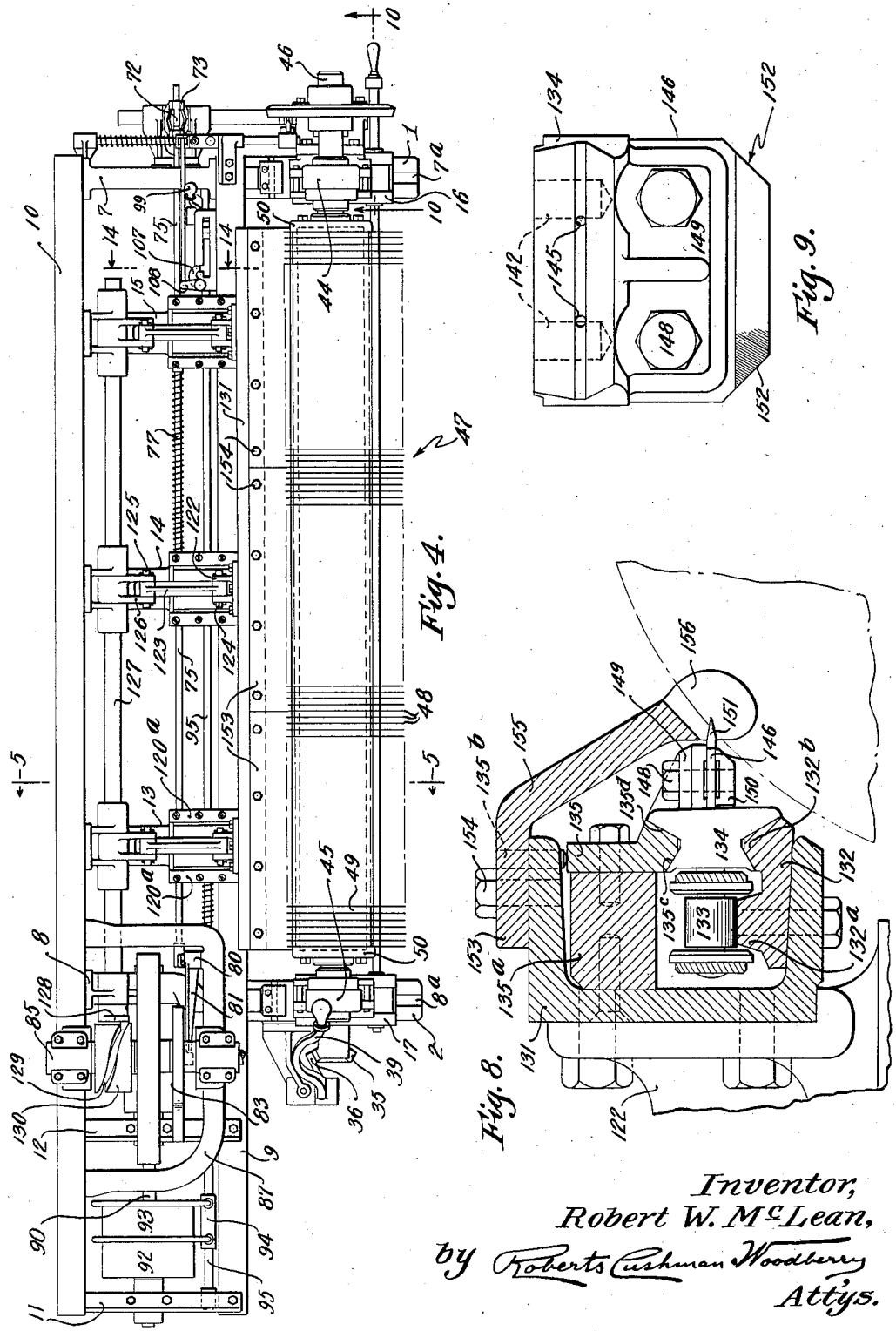
Fig. 4 is a plan view of the apparatus, omitting the cutter chain and the drive means therefor, with a saw cylinder mounted in position for gummings.
Figure 5:
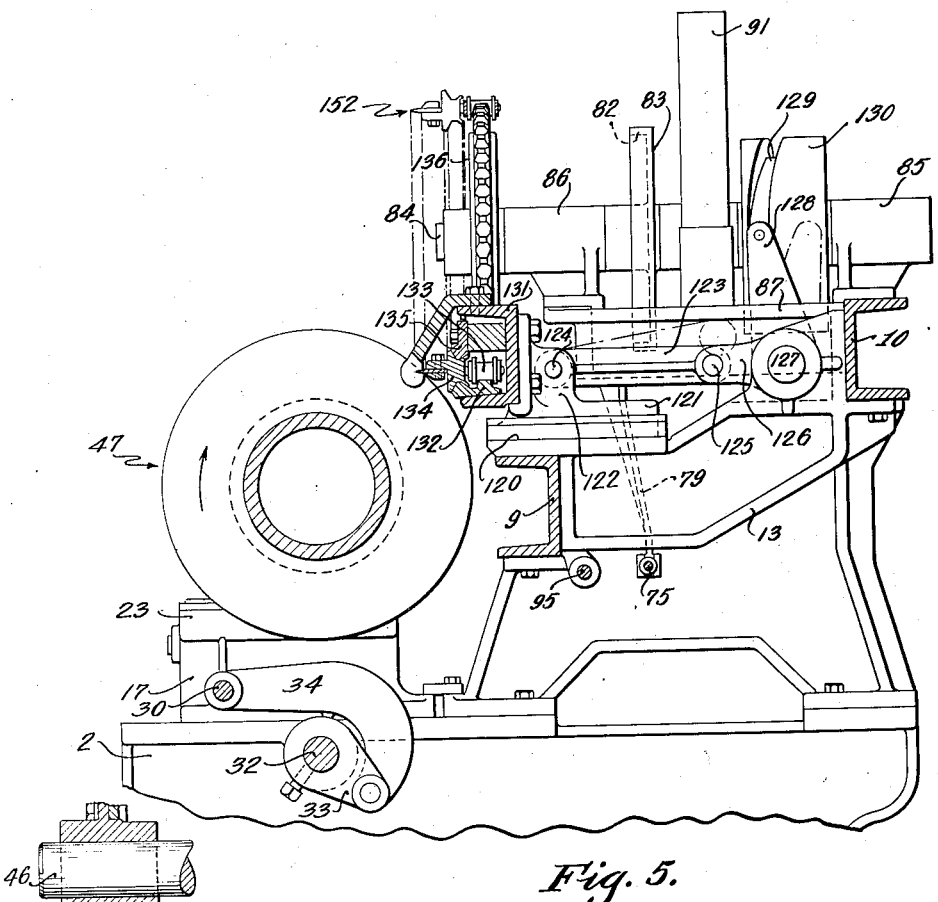
Fig. 5 is a vertical section (the lower part of the frame being broken away), substantially on the line 5—5 of Fig. 4.

Fixed to the shaft 84 is a worm wheel 88 (Fig. 2) which meshes with a worm 89 (Fig. 1) fixed to a drive shaft 90 (Fig. 4). This drive shaft is mounted to turn in bearings secured to the under surfaces of the bridge members 11 and 12, respectively. Preferably, the worm 89 is arranged to turn within an oil reservoir suitably supported by the machine frame, while the upper part of the worm wheel 88 is housed in a casing 91. Obviously, other and equivalent forms of reduction gearing may be substituted for this worm and wheel if desired. The drive shaft 90 carries a fixed or driving pulley 92 and a loose pulley 93, these pulleys being adapted to receive a driving belt (not shown). A belt shipper fork 94 (Fig. 4) is carried by a shipper rod 95 arranged to slide in bearings in suitable supporting brackets carried by the frame. A coiled compression spring 96 encircles the shipper rod and bears at one end against a fixed part of the frame and at its other end against a collar 97 (Fig. 7) fixed to the shipper rod. This spring tends to move the rod to the right and thus to shift the belt from the tight pulley 92 to the loose pulley 93, thereby to stop the machine. Near its right-hand end the shipper rod 95 is connected by means of a link 98 (Fig. 7) to a shipper lever 99 pivoted at its lower end on a stud 100 carried by a bracket secured to the frame member 1. At its upper end the lever 99 is preferably furnished with a handle whereby it may be grasped and actuated to shift the belt from the idle to the driving pulley.

Figure 6:
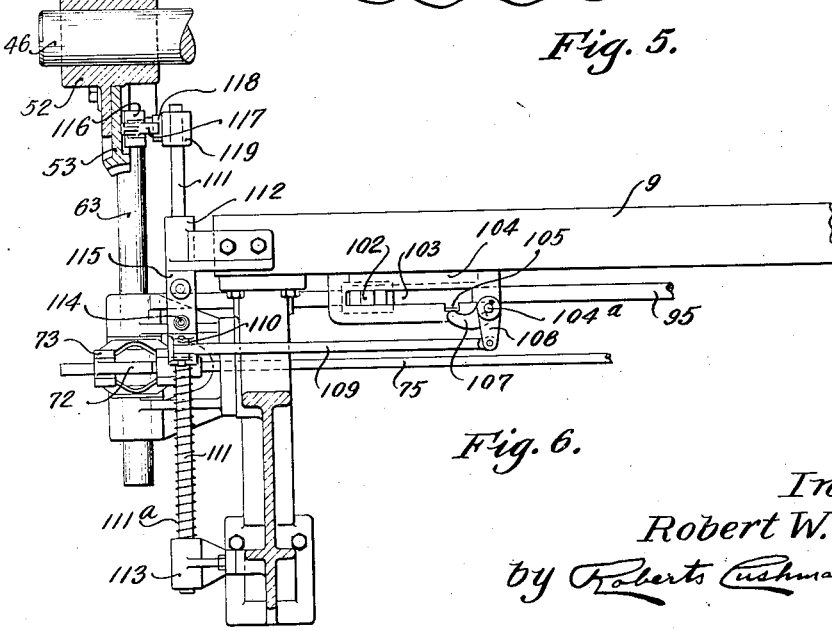
Fig. 6 is a fragmentary horizontal section at the right-hand end of the machine substantially on the line 6—6 of Fig. 3.

Near its right-hand end, the shipper rod has fixedly secured thereto a latch-supporting bracket 101 (Figs. 7 and 14) which pivotally supports a latch 102. This latch projects upwardly into an elongated slot 103 (Figs. 6 and 14) in a guide bracket 104 secured to the rear face of the front channel bar 9. Near the left-hand end of this slot 103, its rear wall is furnished with a recess 105, and when the latch is moved into registry with this recess it is snapped into the latter by a spring 106 (Fig. 14) carried by the latch and bearing against the front wall of the slot 103. When thus seated in the recess, the latch prevents longitudinal movement of the shipper rod, thus keeping the belt on the tight or driving pulley 92. To release the latch from the recess so as to permit the shipper rod to shift the belt onto the loose or idle pulley, I provide a bell-crank release lever mounted on a stud 104ᵃ (Fig. 6) carried by the bracket 104 and having a curved latch-engaging arm 107 normally disposed just to the rear of the recess 105. This release lever has a second arm 108 to which is pivotally connected one end of a rod 109. The other end of the rod 109 is pivotally connected to a rocker 110 (Figs. 3 and 6) secured to a rock shaft 111 mounted to turn in bearings 112 and 113 secured to the outer face of frame member 1. A torsion spring 111ᵃ coiled about the shaft 111 constantly tends to turn the latter in a counterclockwise direction as viewed from its front end.

A tripper handle 114 is secured at its lower end in a sleeve 115 fixed to the rock shaft 111, and by means of this handle 114 the shaft may be rocked in opposition to the spring 111ᵃ, thus swinging the release lever so as to cause its arm 107 to push the latch 102 out of the recess 105, whereupon the spring 96 moves the shipper rod to the right, thus shipping the belt onto the idle pulley and stopping the machine. To start the machine the handle lever 99 is pushed to the left, thus moving the shipper rod so as to shift the belt onto the driving pulley. Near the end of this movement of the shipper rod, the latch 102 snaps into the recess 105, thus again holding the shipper rod in driving position until the latch is again released.

It is desirable to stop the machine automatically after each complete revolution of the saw shaft so that before beginning another revolution the operator may move the cylinder rearwardly by manipulation of the handle 31, thereby to set the saws nearer to the path of the cutters ready for the next cutting operation. For the purpose, the rock shaft 111 is extended forwardly beyond the bearing 112 to a point at the inner side of the indexing gear 53. This gear is furnished with a bracket 116 (Fig. 12) which supports a trip lever having an arm 117, which, as the gear 53 completes a revolution, comes into engagement (as illustrated in Fig. 13) with a cam lug 118 projecting from a collar 119 secured to the rock shaft 111. When the arm 117 engages and depresses the lug 118, the shaft 111 is thereby rocked (until the arm 117 can escape beneath the lug 118, as shown in Fig. 12), thus releasing the shipper latch 102 and allowing the belt shipper rod to shift the belt onto the idle pulley.

Cutting mechanism

The cutter carriage supporting members 13, 14 and 15, which unite the front and rear frame members 9 and 10 respectively, are furnished with substantially horizontal finished upper surfaces 120 (Fig. 5) at their forward portions, providing guides for sliding carriage supporting brackets 121. Each of these brackets is held in place and guided for front to rear motion by means of spaced parallel gibs 120ᵃ, 120ᵃ (Fig. 4) overhanging lateral flanges of the respective bracket. Each supporting bracket 121 has an upwardly directed portion 122 slotted to receive the forward end of a link 123 pivotally secured to the respective bracket by a pin 124. The rear end of each link 123 is connected by means of a pin 125 to a corresponding rocker 126 secured to a rock shaft 127 mounted in bearings carried by the members 8, 13, 14 and 15 respectively. At its left-hand end the shaft 127 is provided with a crank arm 128 furnished with a cam follower roll engaging a cam groove 129 in a cam 130 secured to the shaft 84 which carries the worm wheel 88. The cam groove 129 is of such contour that during each complete revolution of the shaft 88 the several carriage-supporting brackets 121 are moved forwardly once and then retracted, the timing of the parts being such that the carriages are in rearward or retracted position at the time that the indexing pawl 71 is being actuated to turn the saw-cylinder shaft.

The several brackets 121 are fixedly secured to a longitudinally extending channel bar 131 (Fig. 5) having its flanges directed forwardly, said channel bar constituting a cutter-supporting carriage. On the lower flange of bar 131 rests a lower guide rail 132 having portions 132ª and 132ᵇ (Fig. 8) constituting guides respectively for an endless sprocket chain 133 and for a series of cutter holders 134 carried by the chain. The channel bar 131 also supports an upper guide rail 135 forming an upper guide for the cutter holders 134.

The upper guide rail 135 is secured to a spacer block 135ª removably attached to the web of the channel bar 131, and set screws 135ᵇ are provided to take up wear between the parts. The upper and lower guide rails are each provided with convergent guide surfaces 135ᶜ and 135ᵈ adapted accurately to guide the cutter carriers 134 and to sustain the latter against heavy stresses acting from front to rear, the cutter carriers having converging surfaces complemental to and slidably engaging the surfaces 135ᶜ and 135ᵈ.

Cutter drive mechanism

The shaft 84 which carries the worm wheel 88 is extended forwardly beyond its bearing 86 and has secured to it a sprocket wheel 136 (Fig. 1) over which the chain 133 passes and by means of which the chain is driven. Near the right-hand side of the machine the chain passes about an idler sprocket wheel 137 on a stub shaft 138 carried by a bracket 139 secured to the carriage channel bar 131. At a point substantially midway between the sprocket wheels 136 and 137, I preferably provide a fixed support 140 for the upper or idle run of the chain 133. This support has a finished upper surface over which the chain may slide freely and of a width such as to engage the chain between the planes of its side links. This support is adustably secured to a post 141 mounted at its lower end in a bracket attached to the rear side of the front channel bar 9. While I prefer the fixed support 140, I contemplate that other means, for example an idle sprocket wheel, may be used for supporting the chain at this point.

Cutter carrier

Each cutter carrier 134 (Figs. 8 and 9) preferably comprises a block having upper and lower channels whose walls are convergent and complemental to the convergent surfaces 135ᶜ and 135ᵈ of the guide rails, as above noted. As here disclosed (Figs. 8 and 9) each cutter carrier is of the order of two inches in length and is provided with a pair of spaced socket openings 142 in its rear surface adapted to receive forwardly projecting portions of a pair of adjacent link-connecting pins 143 (Fig. 15) of the sprocket chain 133. These pins 143 (Fig. 15) are provided with circumferential grooves 144, and after being seated within the sockets 142, the pins are secured in position by means of cotters 145 (Fig. 9) passing down through vertical bores in the carrier 134 and into the grooves 144 of the respective pins.

Each cutter carrier is thus rigidly united to one link of the sprocket chain. Preferably a cutter carrier is secured to each alternate link of the chain. As here illustrated, the cutters employed are files 146, each file having a body portion of substantially uniform thickness and provided with a pair of spaced openings for the reception of bolts 148. These bolts pass downwardly through openings in a forwardly directed flange 149 of the corresponding cutter carrier 134. This flange has a flat and finished under surface for engagement by the body of the file 146 which is held firmly against said surface by means of a clamping plate 150 having threaded openings for the reception of the threaded ends of the bolts 148. When thus positioned, the rear edge of the file engages a vertical abutment surface of the cutter carrier block so that the file is thus held very firmly and accurately, though removably, in position in the carrier.

As here illustrated, each file has a beveled or V-shaped forwardly extending edge portion 151 upon which are cut file teeth in any desired manner. Preferably the right and left corners 152 of each file are cut away to facilitate engagement of the file with the work as the file is moved transversely from one saw of the cylinder to the next. While I have herein illustrated files as constituting the cutting elements or tools, I contemplate that other and equivalent devices appropriate to the work to be done may be substituted therefor.

In order to support each saw blade during the cutting operation, against the lateral stresses imparted by the moving cutters, I provide a saw blade support or supports, preferably consisting of a plurality of elongate members 153 (Fig. 1), each removably secured by means of bolts 154 to the upper edge of the carriage rail 131. Each supporting member 153 (Fig. 8) has a downwardly and forwardly inclined portion 155 preferably thickened at its lower edge 156. This thickened portion is vertically slotted at proper intervals so as to receive one of the saw blades of the cylinder in each slot, the slots being of a width such that the saw blades enter freely therein but with slight lateral clearance.

Operation

Assuming that a saw cylinder comprising blades having teeth on their edges is to be gummed by the apparatus herein disclosed, and assuming that the driving belt of the machine is on the idle pulley and that the saw-supporting slides 16 and 17 have previously been moved forwardly by manipulation of the handle 39, the operator first removes the bearing saddles 40 and 41 from the brackets 22 and 23 by loosening the bolts 42 and 43, and inserts the opposite end of the saw cylinder shaft in the bearings 44 and 45 respectively. The bearing saddles are again mounted upon the slides 22 and 23 and clamped in position thereon. The operator now mounts the hub 52 of the index gear 53 upon the right-hand end portion of the saw shaft 46, securing it in place by means of the set screw 54, and manipulates the handle 39 so as to move the slides 16 and 17 rearwardly. At the completion of this movement, the line connecting the centers of the pivots of the links 34 is below the axis of the shaft 32 so that the slides 16 and 17 are locked in position with the saw cylinder in the field of action of the cutting instrumentalities.

The handle 31 is now turned so as to bring the saw cylinder up into final position relatively to the cutting devices. If in thus bringing the saw cylinder up into final position, it be found that the cutters are not properly registered with the notches between adjacent teeth of the saws, the bolts 56 which secure the index gear 53 to its hub 52 are loosened and by actuation of the handle 59, the gear is rotated relatively to the hub until the cutters are brought into proper and accurate relation to the notches between adjacent teeth. The bolts 56 are then tightened to lock the index gear to its hub, and the crank 31 may be again further manipulated so as to set the cylinder in proper position for the first cutting action.

The belt shipper lever 99 is now actuated to move the shipper rod so as to shift the belt onto the tight or driving pulley, the rod being held in this position by its latch 102, as above described. The machine is now in operation, and as the shaft 84 turns, the sprocket wheel 136 is driven, thereby moving the chain 133 with its succession of cutters so as to cause each cutter to move longitudinally of the saw cylinder and successively past each of the saw blades. As the chain begins to move, the carriage, comprising the rail 131, the saw supports 155, and the cutter guide rails 132 and 135, is moved forwardly by the action of the groove 129 of cam 130, thus causing the cutters to move forwardly into their forward cutting position. As the forwardly positioned cutters are traversed longitudinally of the saw shaft, each cutter bites into several blades in succession, thus cutting deeper the notch between adjacent blades. The number of successive blades with which each cutter engages during each intermittent forward positioning of the carriage, depends upon the speed of the chain, but since each cutter while in forward, cutting position moves along the same path and by successive stages throughout the whole length of the saw cylinder, it is evident that the notches in adjacent blades throughout the entire cylinder length will be in registry with one another, and that as each cutter engages each blade during its passage, the notch cut in each blade of the series will be of substantially the same shape and dimensions.

As the shaft 84 rotates, the cam groove 129 rocks the shaft 127 and thus at intervals retracts the carriage with the series of cutters away from the saw cylinder. While thus retracted, the cam 83 moves the rod 75 so as positively to cause the pawl 72 to turn the ratchet wheel 71 through the distance of one tooth space, thus turning the index gear 53 and thereby rotating the saw cylinder through a distance corresponding to the thickness of one tooth. The cam 130 now again advances the cutter carriage to cutting position, and the next notch between adjacent teeth of the saws is similarly deepened.

This operation is continued until the saw cylinder has made one complete revolution, whereupon the trip lever 117 carried by the index gear 53 engages the cam lug 118 carried by the rock shaft 111, thus rocking the latter and thereby releasing the latch 102 from the notch 105, so that the belt shipper is moved to stop the machine. The operator now turns the crank handle 31 the proper distance so as bodily to advance the saw cylinder in readiness for taking the next cut. The belt shipper handle 99 is again moved to start the machine and the operation is repeated. These several operations are carried out successively until the saw cylinder has been rotated a sufficient number of times to deepen the notches to the desired amount. If during the operation, it be desired to stop the machine at any time, this may be accomplished by actuating the handle 114.

At the end of the gumming operation, the handle 39 is moved so as to retract the slides 16 and 17 with the saw cylinder out of the field of the cutting instrumentalities; the saddles 40 and 41 are removed; the index gear 53 is removed from the saw shaft, and the latter is removed from the bearings 43 and 44; the machine now being in readiness for introduction of another saw cylinder.

The machine may be used for gumming a blank cylinder, that is, one in which the saw discs have had no teeth at all cut therein previously, and for this purpose is actuated in substantially the same sequence as above described.

I have already noted that the instrumentalities which coact with or upon the saw blades may be other than files or cutters, and I further wish it to be understood that the arrangement herein disclosed for supporting the saw cylinder, whereby it is possible to move it bodily through a substantial distance by manipulation of the handle 39 or its equivalent, and thereafter to move it through small or what may be termed microscopic distances by a finer adjustment, may be employed in mounting the saw cylinder in mechanisms of other specific type, for example, in gummers of other kinds, in saw filing machines, or even in the saw gin itself wherein the cooperating instrumentalities instead of being files or cutters, would be the doffer brush, float roll, grate-fall or other parts of the gin.

While I have herein illustrated a certain desirable embodiment of the invention by way of example, I wish it to be understood that the principle of operation is capable of embodiment in other specific forms and that all substitutions and equivalents and rearrangement of parts, as well as changes in proportions and sizes of parts, may be varied within the scope of the appended claims without departing from the present invention.

I claim:

1. The combination, in a machine for gumming the blades of a gin saw cylinder comprising a shaft having a series of spaced saw blades mounted thereon, of bearings for the shaft, a support for each bearing, a slide carrying each support, guides constraining the slides to move in parallel horizontal paths perpendicular to the vertical plane of the axis of the saw cylinder, the slides having guides in which the bearing supports may move relatively to the slides in horizontal paths perpendicular to the vertical plane of the shaft axis, a shaft extending from one slide to the other journaled in bearings in the respective slides, a pair of worms fixed to said shaft, a worm wheel meshing with each worm, a screw-threaded stud secured to each bearing support and engaging a screw-threaded axial bore in one of the worm wheels respectively, and means for turning the shaft whereby simultaneously to adjust the bearing supports relatively to the slider, a rock shaft mounted in fixed bearings and arranged substantially parallel to the saw cylinder shaft, a pair of cranks secured to the rock shaft, a link connecting each crank to one of the slides, a pinion secured to the rock shaft, a gear meshing with the pinion, and manually actuable means for turning the gear thereby to rock the shaft and simultaneously move the slides, the parts being so relatively disposed and arranged that when the slides are at one limit of their movement, both ends of each link are disposed at the same side of the axis of the rock shaft thereby positively preventing the slides from retreating in response to directly applied stress.

2. Apparatus of the class described comprising bearings for rotatively supporting a saw cylinder shaft carrying a series of saw blades, tooth sharpening means cooperable with all of the saw blades of the cylinder at the same time, said tooth shaping means comprising a series of shaping elements arranged to move, when in contact with the saw blades, in a path which is substantially parallel to the axis of the saw cylinder, means operative to move said elements bodily along said path, and indexing means for intermittently turning the saw cylinder to present each tooth of each saw, in turn, to the tooth sharpening means, and stop means automatically operable at the completion of each rotation of the saw shaft to stop the machine.

3. A machine of the class described comprising bearings for rotatably supporting a saw cylinder shaft carrying a series of saw blades, instruments cooperating with the blades, and indexing means for intermittently turning the saw cylinder to present successive portions of each saw blade to said instrumentalities, said indexing means comprising a part having means for fixedly securing it to the saw shaft, a part which is intermittently turned, and means for adjusting said parts relatively to each other.

4. A machine of the class described comprising bearings for rotatably supporting a saw cylinder shaft carrying a series of saw blades, instruments cooperating with the blades, and indexing means for intermittently turning the saw cylinder to present successive portions of each saw blade to said instrumentalities, a hub member having means for fixedly securing it to the saw shaft, a part coaxial with said hub, said part turning intermittently step by step, means normally securing said part to the hub for concomitant rotation, and means for angularly adjusting said part relatively to the hub.

5. A machine of the class described comprising bearings for rotatably supporting a saw cylinder shaft carrying a series of saw blades, instruments cooperating with the blades and indexing means for intermittently turning the saw cylinder to present successive portions of each saw blade to said instrumentalities, a driven part having means for fixedly securing it to the saw shaft, a driving part coaxial with the driven part, an eccentric adjusting element operative to turn one of said parts relatively to the other for adjustment thereof, means for securely uniting said parts for adjustment to ensure concomitant rotation, and means for intermittently turning the driving part.

6. A machine of the class described comprising bearings for rotatably supporting a saw cylinder shaft carrying a series of saw blades, tooth shaping means cooperating simultaneously with all of the blades, said tooth shaping means comprising a series of shaping elements arranged to move, when in contact with the saw blades, in a path which is substantially parallel to the axis of the saw cylinder, means operative to move said elements bodily along said path, and indexing means for intermittently turning the saw cylinder to present successive portions of each saw blade to said tooth shaping means, a driven part having means for fixedly securing it to and concentric with the shaft, a driving part coaxial with the shaft, means adjustably uniting the driven to the driving part, means for intermittently turning the driving part, stop mechanism for the machine, and a trip member rotating with said driving part and operative at the end of each complete rotation of the saw shaft to actuate the stop mechanism.

7. A machine of the class described comprising bearings for rotatably supporting a saw cylinder shaft carrying a series of saw blades, tooth shaping means cooperating with all of the blades at the same time, said tooth shaping means comprising a series of shaping elements arranged to move, when in contact with the saw blades, in a path which is substantially parallel to the axis of the saw cylinder, means operative to move said elements bodily along said path, and indexing means for intermittently turning the saw cylinder to present successive portions of each saw blade to said tooth shaping means, the indexing means including a part normally rotating in time with the saw shaft, a trip element carried by said rotating part, and stop mechanism actuated by said trip element at the end of each complete rotation of the saw shaft to stop the driving of the machine.

8. Apparatus of the class described comprising means for supporting a saw cylinder comprising a shaft carrying a series of gin saw blades, means for rotating the saw shaft intermittently step by step, an elongate cutter carriage having a cutter guide and a chain guide extending substantially parallel to the axis of the saw shaft, means guiding said carriage for movement toward and from the periphery of the saw cylinder while keeping said guiding means substantially parallel to the axis of the saw shaft, an endless chain having one run thereof disposed in engagement with the chain guide of the carriage, a series of cutter carriers attached to the chain, the cutter carriers carried by said guided run of the chain engaging the cutter guide and being supported and positioned by the latter, a cutter mounted on each carrier means for moving the chain to cause its series of cutters to move lengthwise of the saw cylinder always in the same direction, means for advancing the carriage toward the saw blades and to hold it in advanced position while the saw shaft is stationary thereby to cause the cutters, in traversing the guide, to engage the peripheries of successive saw blades of the series, said advancing means being operative to retract the carriage from the periphery of the cylinder prior to and during each intermittent rotation of the saw shaft.

9. Apparatus of the class described comprising means for supporting a saw cylinder comprising a shaft carrying a series of spaced gin saw blades, means for rotating the saw shaft intermittently step by step, an elongate cutter carriage having a cutter guide and a chain guide extending substantially parallel to the axis of the saw shaft, means guiding said carriage for movement toward and from the periphery of the saw cylinder while keeping said guides substantially parallel to the axis of the saw shaft, an endless chain having one run thereof disposed in engagement with the chain guide of the carriage, a series of cutter carriers connected to the chain, the carriers being so short as to permit them to follow the path of the endless chain, the cutter carriers carried by said guided run of the chain engaging the cutter guide and being supported and positioned by the latter, an elongate saw gumming cutter mounted on each carrier, each cutter having a guiding cam surface at its advancing end, means for moving the chain to cause its series of cutters to move along the cutter guide always in the same direction, means for moving the carriage toward the saw blades thereby to cause the cutters in traversing the guide to engage the peripheries of successive series of saw blades, and means for retracting the carriage, together with said guided run of the chain and the corresponding cutter carriers, prior to and during each intermittent rotation of the saw shaft.

10. Saw gumming apparatus operative simultaneously to gum a series of substantially parallel spaced saw blades, said apparatus comprising a plurality of sharpening elements, means operative to move the several sharpening elements in succession always in the same direction in an endless path which comprises a substantially straight run perpendicular to the planes of the saw blades and adjacent to the edges of the blades, said sharpening elements being individually so short in the direction of their movement that they can readily follow said endless path, movable guide means constraining the sharpening elements to press against the edges of the blades as said elements pass from one blade to another of the series in moving along the straight portion of said path, means operative to hold the saw cylinder shaft stationary while the sharpening elements are in contact with the saw blades, and means operative intermittently to move the saw cylinder shaft and the guide means relatively to each other to separate the sharpening elements from the saw blades.

11. Saw gumming apparatus comprising in combination means for supporting a saw shaft having thereon a series of spaced, substantially parallel circular saw blades, and means operative to gum the blades comprising a plurality of files, each furnished with a marginal portion having a series of teeth thereon and having a substantially straight edge, means uniting said files to form an endless articulated series, means operative to drive said series always in the same direction and in an endless path comprising a substantially straight run parallel to the axis of the saw shaft and adjacent to the edges of the saw blades, the files being individually so short in the direction of their movement as to permit them readily to follow said endless path, and rigid guide means operative to press the files against the edges of the blades as the files move from one blade to another of the series in traversing the straight portion of said path.

12. Saw gumming apparatus operative to gum a series of substantially parallel spaced saw blades, said apparatus comprising a gumming instrumentality, means for moving said instrumentality in an endless path which comprises a substantially straight run perpendicular to the planes of the saw blades and adjacent to the edges of the blades, said gumming instrumentality being so short in the direction of its movement as to permit it readily to follow said endless path and having a substantially straight edge for engagement with the saw blades, means operative to move said instrumentality always in the same direction and successively from one blade of the series to another while gumming a corresponding tooth of each blade, means operative to separate the gumming instrumentality from the blades after one tooth of each blade has been gummed, and means operative simultaneously to advance the several blades relatively to said straight portion of the path of the gumming instrumentality, thereby to place another tooth of each blade in gumming position.

13. Saw gumming apparatus operative to gum a series of substantially parallel spaced saw blades, said apparatus comprising a gumming instrumentality, means for moving said instrumentality in an endless path which comprises a substantially straight run perpendicular to the planes of the saw blades and adjacent to the edges of the blades, said gumming instrumentality being so short in the direction of its movement as to permit it readily to follow said endless path and having a substantially straight edge for engagement with the saw blades, means operative to move said instrumentality always in the same direction and successively from one blade of the series to another while gumming a corresponding tooth of each blade, means operative to separate the gumming instrumentality from the blades after one tooth of each blade has been gummed, means operative simultaneously to advance the several blades relatively to said straight portion of the path of the gumming instrumentality, thereby to place another tooth of each blade in gumming position, and means operative to stop the machine automatically when all of the teeth of each blade have been gummed.

14. Apparatus of the class described comprising means for supporting a saw cylinder comprising a shaft carrying a series of spaced substantially parallel saw blades, a rigid guide providing a guideway extending substantially parallel to the saw cylinder shaft, file carriers arranged to slide along said guideway, each file carrier comprising clamping means for holding a file in position to engage the edges of successive saws of the saw cylinder as the carriers move along the guideway, an endless chain having a run disposed parallel to the guideway, means securing the file carriers to the chain, means operative to move the chain always in the same direction, the file carriers being so short as to permit them to move in an endless path with the chain, a file secured to each carrier, each file having a series of teeth, means operative to hold the saw cylinder shaft stationary while the files are in contact with the saws, and means operative intermittently to move the saw cylinder shaft and the file carrier guide, relatively to each other, to separate the files from the saw blades.

15. Apparatus of the class described comprising means for supporting a saw cylinder comprising a shaft carrying a series of spaced, substantially parallel gin saw blades, a guide extending substantially parallel to the shaft, means for rotating the shaft intermittently step by step, a cutter, means for moving the cutter longitudinally of the saw shaft from one saw blade to another, always in the same direction along an endless path, while the shaft is stationary, the cutter being so short as to permit it readily to move in said endless path, said path including a substantially straight run parallel to said guide along which the cutter moves from one end of the cylinder to the other, means operative to move the guide toward the periphery of the saw cylinder while the shaft is stationary, thereby to cause the cutter to engage successive blades of the cylinder as the cutter moves along the guide, said means being also operative to retract the guide and the cutter from the periphery of the cylinder prior to each intermittent rotation of the shaft, and means operative to stop the machine at the end of each complete rotation of the saw cylinder shaft.

ROBERT W. McLEAN.